No. 788,420. PATENTED APR. 25, 1905.
J. J. MURPHY.
NUT LOCK.
APPLICATION FILED DEC. 17, 1904.

Witnesses
Frank B. Hoffman
C. C. Hines

Inventor
James J. Murphy.
By Victor J. Evans
Attorney

No. 788,420. Patented April 25, 1905.

UNITED STATES PATENT OFFICE.

JAMES J. MURPHY, OF SPRINGFIELD, ILLINOIS.

NUT-LOCK.

SPECIFICATION forming part of Letters Patent No. 788,420, dated April 25, 1905.

Application filed December 17, 1904. Serial No. 237,260.

*To all whom it may concern:*

Be it known that I, JAMES J. MURPHY, a citizen of the United States, residing at Springfield, in the county of Sangamon and State of Illinois, have invented new and useful Improvements in Nut-Locks, of which the following is a specification.

This invention relates to improvements in nut-locks of that kind in which securing and jam nuts are used in conjunction with a bolt or other fastening element having right and left threaded portions, the object of the present invention being to provide a nut-lock device which is simple and inexpensive of construction and adapted for locking securing and jam nuts in a superior manner upon bolts employed in rail connections or upon the axles of vehicles, wrist-pins of engines, and other elements upon which fastening-bolts are used.

With this and other objects in view the invention consists of the features of construction, combination, and arrangement of parts hereinafter more fully described and claimed, reference being had to the accompanying drawings, in which—

Figure 1:
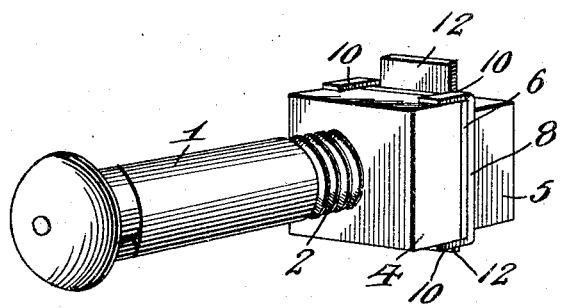
Figure 2:
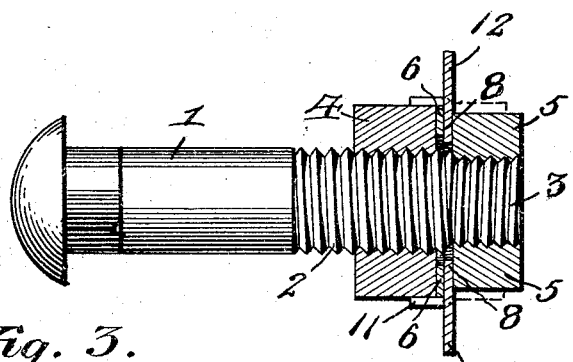
Figure 3:
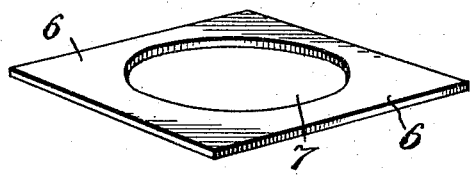
Figure 4:
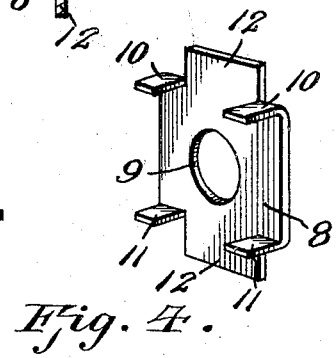

Figure 1 is a perspective view of a right and left threaded bolt, showing securing and jam nuts locked thereon by my improved locking plate or washer. Fig. 2 is a side elevation of the bolt and section through the nuts, spacing-washer, and locking plate or washer. Fig. 3 is a detail view of the spacing-washer, and Fig. 4 is a similar view of the nut-lock plate or washer.

The numeral 1 in the drawings represents a fastening element, which may be a bolt, as shown in the present instance, the end of an axle, a wrist-pin, or other similar object upon which it is designed to lock a nut. The shank of this element is provided for a portion of its length near its outer end with a right-hand screw-thread 2, which extends to a point near the outer end of the bolt, and beyond said point the diameter of the bolt is reduced and provided with a left-hand thread 3.

On the bolt is an ordinary securing-nut 4, which is provided with a right-hand internal thread adapted to engage the threaded portion 2 of the nut and is adapted to clamp the object or objects to be secured against the head of the bolt. This nut 4 is preferably hexagonal in form, but may be of any other suitable form to serve the purpose. A jam-nut 5 of a form corresponding to the securing-nut 4, but of slightly-smaller size, is provided with an internal left-hand thread to engage the threaded portion 3 of the bolt and coact with the locking plate or washer hereinafter described to hold the nut 4 against retrogression.

Disposed between the two nuts is a spacing-washer 6, which corresponds in size and form to the securing-nut 4 and is provided with a central opening 7 of sufficient diameter to enable it to be fitted upon the larger threaded portion 2 of the bolt without coming in contact with the threads thereof. This washer is designed to take up the space between the securing-nut and the locking-washer which is disposed between it and the jam-nut and preferably to lie at a point between or at the junction of the threaded portions 2 and 3 of the bolt to properly space the jam-nut therefrom and obviate the necessity of recessing the base or inner side of said jam-nut to adapt it to be screwed up to the desired position.

The locking-washer comprises a substantially rectangular plate 8, provided with a central opening 9, whereby it may be fitted upon the bolt or fastening element and having at its corners tongues 10, adapted to be bent inwardly to engage the sides of the securing-nut 4 to hold the same from rotation. Between the opposite pairs of tongues 10 the washers are also provided with intermediate tongues 12, which are adapted to be bent in reverse direction to engage opposite sides of the jam-nut 5 and also hold the latter from rotation. In practice the length of the bolt or fastening element is so proportioned with respect to the width of the parts to be secured that the outer face of the securing-nut when screwed up will lie slightly in rear of the outer convolution of the right-hand thread 2, while the jam-nut 5 is adapted when screwed on the reduced threaded portion 3 to have its inner face terminate slightly in rear of the inner convolution of said portion 3.

Spacing-washers of different thicknesses may however, be employed to compensate for any variations in width of the part to be secured, so that the jam-nut need not be screwed on to any further extent or recessed to pass the outer end of the threaded portion 2. As clearly shown in Fig. 2, the spacing-washer 6 when applied lies against the outer face of the nut 4, while the locking-washer 8 is disposed between the spacing-washer and inner side of the nut 5, and these two washers are so arranged as to break joint with or lie opposite the contiguous terminal convolutions of the threaded portions 2 and 3, thus spacing the nuts in such manner as to obtain the most effective result. After the nuts and washers have been applied the tongues 10 of the locking-washer 8 are bent inward to embrace the sides of the nut 4 and sides of the washer 6, thus preventing the same from having retrograde movement on the screw-threaded portion 2, and then the tongues 12 are bent outward to engage opposite sides of the nut 5 to hold the latter in a similar manner against movement. The two washers will then be locked securely upon the threaded portions 2 and 3 of the bolt, so that they cannot possibly work loose and can only be casually detached by excessive strain of an extent to strip the threaded portions 2 and 3. It will be observed that when the tongues 12 are bent to engage the nut 5 their peculiar position with respect to the opposite pairs of nuts 10, between which they lie, causes them to be effectually reinforced, as any strain upon the nut 5 in one direction or the other will cause the side edges of the tongues 12 to engage and be reinforced by the side edges of the tongue 10. By arranging the tongues 10 to engage the sides of both the nut 4 and washer 6 both of these parts are prevented from having independent movement and straining the bolt-threads or causing undue frictional resistance to the detachment of the nuts when their removal becomes necessary.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what is claimed as new is—

The combination with a fastening element having a shank provided with portions of different diameters and reversely threaded, of a securing-nut engaging the inner threaded portion and having its outer face lying in rear of the outer convolution of said threaded portion, a smaller jam-nut engaging the outer threaded portion and having its inner face lying in rear of the inner convolution of said outer threaded portion, a rectangular spacing-washer disposed between the nuts and bearing against the outer face of the securing-nut and having its edges flush with the sides of the nut, and a rectangular locking-washer disposed between the spacing-washer and jam-nut and provided at opposite corners with tongues bent to engage the contiguous sides of the securing-nut and edges of the spacing-washer and intermediate tongues bent in the opposite direction to engage sides of the jam-nut, said washers being disposed to break joint with the contiguous threads of the reversely-threaded portions of the shank to limit the movement of the jam-nut, whereby the necessity of recessing said nut to adapt it to be screwed up to the desired position is avoided, substantially as described.

In testimony whereof I affix my signature in presence of two witnesses.

JAS. J. MURPHY.

Witnesses:
   JOHN B. STROUB,
   NETTIE LAMKEY.